Jan. 20, 1959 C. I. L. CRONBURG, JR., ET AL 2,870,271

AUTOMATIC TRANSMISSION REGULATION

Filed Oct. 11, 1956

INVENTORS: C. I. L. CRONBURG, JR.
C. S. YEUTTER

R. B. Ardis

ATTORNEY 2,870,271

AUTOMATIC TRANSMISSION REGULATION

Claude I. L. Cronburg, Jr., Lynnfield, and Clyde S. Yeutter, North Andover, Mass., assignors to Bell Telephone Laboratories, Incorporated, New York, N. Y., a corporation of New York Application October 11, 1956, Serial No. 615,392

7 Claims. (Cl. 179—171.9)

This invention relates generally to arrangements for regulating the gain of amplifier circuits in a carrier telephone system and more particularly, although in its broader aspects not exclusively, to regulators for use in carrier telephone repeaters which carry a number of speech channels simultaneously.

In the past, regulator circuits have been widely used in carrier telephone systems to counteract slow variations in transmission level such as those caused by changes in ambient temperature. In general, such regulators have operated either in response to changes in total signal power level or in response to changes in the magnitude of one or more selected frequencies to adjust the magnitude of a variable impedance controlling the gain of, or the magnitude of the transmission into, an amplifier. Thermistors in particular have been widely used as such variable impedance elements because of their inherently long time constants. The time lag between a change in the applied voltage or current is sufficiently great, in other words, to prevent the resulting change in impedance magnitude from following instantaneous fluctuations in signal amplitude.

While conventional regulator circuits using thermistors are generally quite satisfactory for use in ordinary toll carrier systems, serious problems arise when it is attempted to apply them to a rural or subscriber-loop carrier telephone system such as that disclosed in copending application Serial No. 455,099, filed September 10, 1954, by V. J. Hawks, E. K. Van Tassel, and D. C. Weller. Such a carrier telephone system is used between the telephone central office and individual subscribers, rather than only between central offices, and most of its outlying terminal and repeater equipment is pole-mounted and operated independently of any central office or commercial power supply. Transistors are used throughout the system disclosed in the Hawks-Van Tassel-Weller application in order to achieve the low power drain requirements dictated by the use of local primary power sources at the remote terminal and repeater locations. When it is attempted to use thermistors to provide regulation in such a system, it is found that their power requirements tend to be excessive. Not only do thermistors tend to require a fairly large amount of power for their operation, but they also normally require an additional amount of power to bias them to the desired point in their operating characteristics and to compensate for temperature variations. As a substitute, semiconductor diodes (commonly known as varistors) have been used for this purpose in connection with terminal amplifiers which carry only a single speech channel at a time. They have much lower power requirements and tend, therefore, to be much better suited for use in the type of carrier telephone system disclosed in the Hawks-Van Tassel-Weller application.

Semiconductor diodes are, however, subject to two difficulties when they are used to control the level of the signal energy flowing into an amplifier in a carrier telephone repeater carrying a number of speech channels simultaneously. In the first place, if objectionable crosstalk and interchannel modulation are to be avoided, operation of the variolosser formed by the diodes must have a considerably greater degree of linearity than is normally possible. In the second place, the time constant of the regulator action provided by a diode variolosser is inherently short, giving the regulator action a tendency to follow instantaneous variations in signal amplitude unless an undesirably large capacitor is provided between the regulator circuit rectifier and the variolosser diodes, i. e., across the input of the variolosser.

A principal object of the invention is, therefore, to reduce crosstalk and interchannel modulation in as simple a manner as possible in a multichannel repeater regulator using a diode variolosser to adjust transmission magnitude.

Another and more particular object is to improve the linearity of operation in a semiconductor diode type repeater regulator circuit.

Still another object is to increase the time constant of the action of a semiconductor diode-type regulator circuit without the use of undesirably large shunt capacitors.

In accordance with the present invention, both the linearity and the time constant of the action of a backward-acting diode-type regulator circuit are increased through the addition of a direct-coupled single-stage transistor amplifier of the so-called common-collector (sometimes known as emitter follower) configuration with a capacitor connected between the base and collector electrodes of the transistor. For controlling the gain of an amplifier circuit, the regulator includes at least one variolosser diode connected across the input side of the regulated amplifier controlling the magnitude of energy transmission therethrough, a rectifier circuit connected to receive a portion of the output energy of the regulated amplifier, and a direct-coupled common-collector transistor amplifier having a capacitor interconnecting the base and collector electrodes of the transistor coupled between the rectifier circuit and the variolosser diode. The rectifier circuit is poled to provide a forward emitter bias for the transistor amplifier, and the variolosser diode is poled in the direction of positive transistor emitter current flow. In operation, the transistor amplifier not only increases the control current flowing through the diode relative to the incoming signal current, thereby operating the diode in a more linear portion of its impedance-current characteristic, but also increases the time constant of the regulator action to an important degree. The effect of the capacitor connected between the base and collector electrodes of the transistor is greatly magnified, thereby providing a regulator time constant sufficiently long to prevent the regulator action from following instantaneous signal variations without the use of an unduly large capacitor.

In the above-described form, the invention is equally applicable whether the regulator is operated in response to changes in total signal power level or in response to changes in the magnitude of one or more selected frequencies. In the latter instance, a filter tuned to the selected pilot frequencies is generally used to supply those frequencies from the regulated amplifier output to the regulator rectifier circuit.

A more complete understanding of the invention may be obtained from the following discussion of a specific embodiment. In the drawings.

Figure 1:
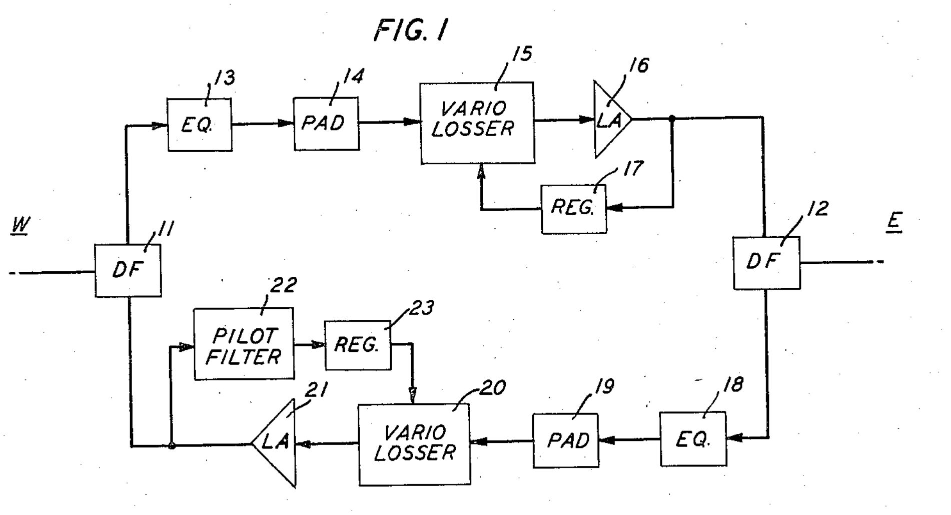
Fig. 1 illustrates a complete multichannel carrier regulated repeater suitable for application of the present invention.

The repeater illustrated in block diagram form in Fig. 1 is an example of a repeater suited for use in a rural or subscriber-loop carrier telephone system like that disclosed in the above-noted copending application of Hawks, Van Tassel, and Weller. To the extent illustrated, the repeater is largely conventional and, by way of example, provides for regulation on a total power basis in the channels from W to E and for regulation on a pilot frequency basis in the channels from E to W. In general, the regulation is needed in systems long enough to require two or more repeaters. For regulation on a pilot frequency basis, the pilot frequency is usually generated at the first repeater at the subscriber end of the carrier line, preferably by a transistor oscillator like those disclosed in copending application Serial No. 456,661, filed September 17, 1954, by E. K. Van Tassel and R. E. Yaeger.

The repeater shown in Fig. 1 is coupled to the carrier line by means of a pair of directional filters 11 and 12. Each directional filter includes a high-pass section and a low-pass section for separating the two directions of transmission. To facilitate this, a grouped frequency allocation is used, in which the carrier frequencies used for transmitting in one direction are all above those used for transmitting in the opposite direction.

In Fig. 1, the path from W to E includes an example of a regulator circuit operating on a total power basis. From directional filter 11 at the W end of the repeater, the path includes an equalizer network 13 to impart the desired over-all amplitude-frequency characteristic to the incoming signals, a resistance pad 14, a variolosser network 15, and a transistor line amplifier 16. A regulator control network 17, which will be described later and which includes at least a rectifier circuit, is connected between the output side of line amplifier 16 and variolosser network 15.

The path from E to W in the repeater shown in Fig. 1 is much the same as the path from W to E. From directional filter 12, the path includes an equalizer network 18, a resistance pad 19, a variolosser network 20, and a transistor line amplifier 21. All of these components are, in general, substantially the same as the corresponding components in the path from W to E. Since the regulation in the E–W path is on a pilot frequency basis, however, the output side of line amplifier 21 is connected to variolosser network 20 through a narrow-band pilot filter 22 which precedes regulator control network 23 in the control path.

Figures 2, 3:
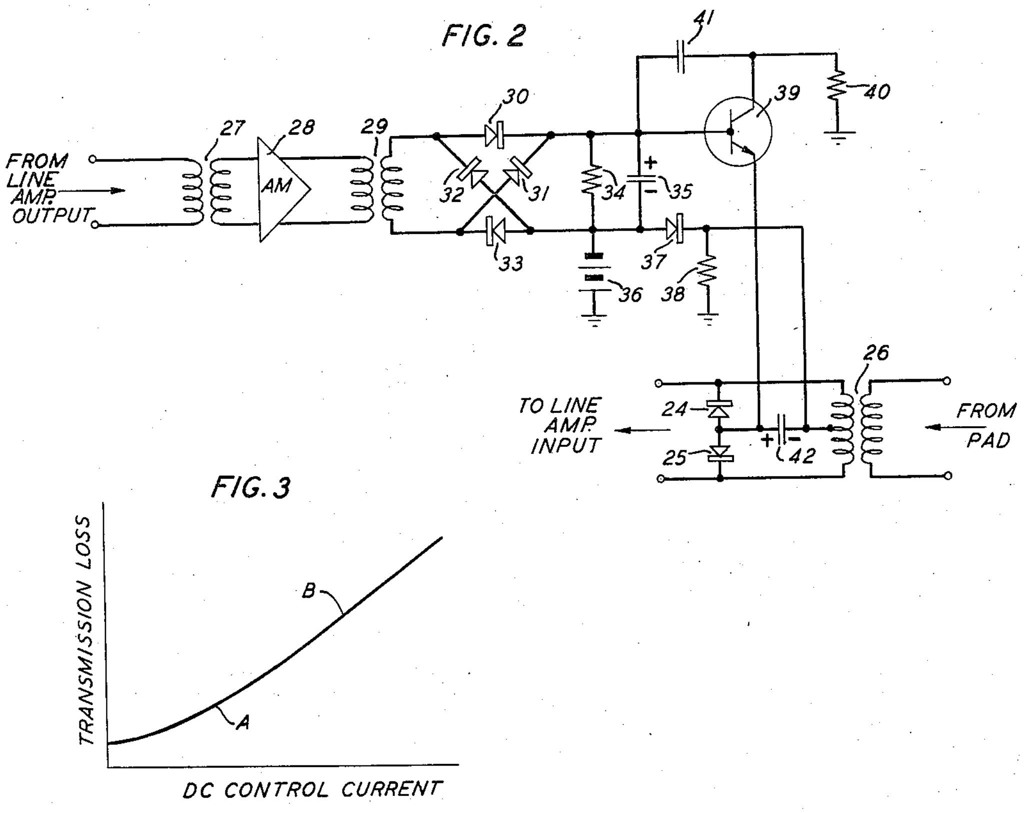
Fig. 2 depicts a regulator circuit embodying the present invention for increasing both the linearity and the time constant of the operation of a semiconductor diode type variolosser.
Fig. 3 shows the control current versus transmission loss characteristic of a semiconductor diode-type variolosser like that used in the embodiment of the invention illustrated in Fig. 2.

A preferred embodiment of the invention is illustrated in Fig. 2 and may, by way of example, be considered to be composed of either variolosser network 15 and regulator control network 17 or variolosser network 20 and regulator control network 23 in Fig. 1. As shown in Fig. 2, the variolosser network comprises a pair of oppositely poled semiconductor diodes 24 and 25 connected in series across the input side of the line amplifier. These diodes, which are preferably of the silicon alloy junction type, are poled for easy current flow away from their common point. A transformer 26 has its primary winding connected across the associated resistance pad and its secondary winding connected across the series combination of diodes 24 and 25.

The output side of the line amplifier is coupled either through another resistance pad or through another resistance pad and a band-pass pilot filter, depending upon the type of control used, to the primary winding of a transformer 27. A two-stage transistor amplifier 28, which may be like those disclosed in copending application Serial No. 409,684, filed February 11, 1954, by R. E. Yaeger, (United States Patent 2,844,667, issued July 22, 1958), is connected between the secondary winding of transformer 27 and the primary winding of transformer 29. The secondary winding of transformer 29 is connected to a full-wave rectifier made up of diodes 30, 31, 32, and 33. Diodes 30 and 33 are oppositely poled and form the series arms of a four-terminal lattice network, while diodes 31 and 32 are oppositely poled and form the cross arms. A terminating resistor 34 and a bypass capacitor 35 are connected in parallel across the output terminals of the rectifier.

In order to increase the sensitivity of the regulating action in the embodiment of the invention illustrated in Fig. 2, the output voltage from the full-wave rectifier is balanced against a standard reference voltage established by a direct voltage source 36, an avalanche breakdown diode 37, and a resistor 38. The negative terminal of voltage source 36 is connected to terminating resistor 34 on the negative side of the full-wave rectifier and the positive terminal is grounded. Diode 37, which is preferably of the silicon junction type having a breakdown voltage of about 6 volts, is connected in series with resistor 38 between the negative terminal of source 36 and ground. Diode 37 is poled for easy current flow in the direction from the negative terminal of voltage source 36 to ground. In the embodiment of the invention illustrated in Fig. 2, the differential voltage at the positive side of rectifier terminating resistor 34 ranges from 0 to 0.7 volt.

The control current versus transmission loss characteristic of a semiconductor diode type of variolosser like that used in Fig. 2 is illustrated in Fig. 3. As has already been pointed out, the variolosser linearity requirements are quite severe in a regulator for a carrier telephone repeater carrying a number of speech channels simultaneously. If objectionable crosstalk and interchannel modulation are to be avoided, the operation of the regulator must be much more nearly linear than if only a single speech channel were to be carried. Since the output of the full-wave rectifier in Fig. 2 would suffice only to operate the variolosser in the vicinity of A in Fig. 3, the required linearity would most likely not be obtained. In addition, the time constant of the regulator action must be longer or the tendency of the regulator to follow instantaneous variations in signal amplitude, as opposed to slow variations in carrier level, will also result in objectionable cross talk and interchannel modulation.

In accordance with the present invention, both the objective of greater variolosser linearity and the objective of a suitably long time constant are realized with the aid of a single-stage direct-coupled common-collector (sometimes called emitter follower) transistor stage coupled between the full-wave rectifier and the variolosser diodes and having a capacitor connected between its base and collector electrodes. The transistor 39 is an n-p-n junction transistor and has its base electrode connected to the positive side of rectifier terminating resistor 34, its emitter electrode connected to the common point between variolosser diodes 24 and 25, and its collector electrode returned to ground through a resistor 40. A capacitor 41 is connected between the base and collector electrodes of transistor 39. The common point between avalanche breakdown diode 37 and resistor 38 is connected to an intermediate point on the secondary winding of transformer 26 in the variolosser circuit, and a bypass capacitor 42 is connected from the same intermediate point on the secondary winding of transformer 26 to the common point between variolosser diodes 24 and 25.

As illustrated in Fig. 2, the polarity of the diodes in the full-wave rectifier is such as to provide a forward emitter bias for transistor 39. When the positive voltage provided by the rectifier fails to exceed the reference level established by avalanche breakdown diode 37, there is no forward emitter bias and no control current is supplied to the variolosser diodes. When the rectifier output voltage exceeds the reference, however, the emitter electrode of transistor 39 is forward biased and control current is supplied to the variolosser diodes, the amount depending upon the amount of the net forward bias. Diodes 24 and 25, it will be noted, are connected substantially in parallel in the common emitter-base collector-emitter path of transistor 39 and are poled in the direction of positive emitter current flow.

As shown at B in Fig. 3, the present invention provides increased linearity of variolosser operation by increasing the amount of direct control current flowing in diodes 24 and 25, thereby reducing variolosser impedance until the variolosser is in substantially the linear portion of its operating characteristic. As long as the A.-C. signal currents in the variolosser are small in comparison with the D.-C. control current, highly linear operation is provided. The variolosser diode pair presents an extremely variable load impedance to the regulator control circuit, changing from thousands down to hundreds of ohms with increasing control current. This variable load in the emitter circuit of transistor 39 causes a variation in the transistor base circuit input impedance but the absolute value is at least several orders of magnitude higher than would be possible without the transistor.

The invention provides a substantial increase in the time constant of the regulator action with the same circuitry but in a somewhat different manner. The capacitor 41 connected between the base and collector electrodes of transistor 39 has its effective time constant increased by an effect somewhat analogous to the so-called Miller effect in the vacuum tube art. As a result, an effective time constant of from 6 to 7 seconds is obtained in spite of the relatively low impedances presented in the circuit. Without the transistor 39 and its associated circuitry, a capacitor much larger than bypass capacitor 35 would have to be connected across the variolosser input to achieve the same result and would tend not only to be expensive and inconvenient from a size standpoint but also to introduce undesirable electrical effects such as parasitic capacitance to ground.

It is to be understood that the above-described arrangements are illustrative of the application of the principles of the invention. Numerous other arrangements may be devised by those skilled in the art without departing from the spirit and scope of the invention.

What is claimed is:

1. A transmission regulator which includes a wave transmission circuit, at least one diode connected to control the magnitude of energy transmission through said wave transmission circuit, a rectifier circuit, means to supply at least a portion of the output energy of said wave transmission circuit to said rectifier circuit, and means to increase both the linearity and the time constant of the regulator action which comprises a transistor amplifier of the common-collector configuration connected between said rectifier circuit and said diode, said rectifier circuit being poled to provide a forward emitter bias for said transistor amplifier and said diode being poled in the direction of positive emitter current flow in said transistor amplifier, and a capacitor connected between the base and collector electrodes of said transistor amplifier.

2. A transmission regulator which includes a wave transmission circuit, at least one diode connected to control the magnitude of energy transmission through said wave transmission circuit, a rectifier circuit, means to supply at least a portion of the output energy of said wave transmission circuit to said rectifier circuit, and means to increase both the linearity and the time constant of the regulator action which comprises a transistor having an emitter electrode, a collector electrode, and a base electrode, a first D.-C. circuit path including said rectifier circuit intercoupling a first pair of said electrodes, a second D.-C. circuit path including said diode intercoupling a second pair of said electrodes, a portion of said second circuit path including said diode being common to said first circuit path, and a capacitor connected between a third pair of said electrodes.

3. A transmission regulator which includes an amplifier, at least one diode connected across the input side of said amplifier, to control the transmission of energy into said amplifier, a rectifier circuit, means to supply at least a portion of the output energy of said amplifier to said rectifier circuit, and means to increase both the linearity and the time constant of the regulator action which comprises a transistor having an emitter electrode, a collector electrode, and a base electrode, a first D.-C. circuit path including said rectifier circuit intercoupling said base and emitter electrodes, said rectifier circuit beng poled to provide a forward emitter bias for said transistor, a second D.-C. circuit path including said diode intercoupling said emitter and collector electrodes, the portion of said second circuit path including said diode being common to said first circuit path and said diode being poled in the direction of positive emitter current flow in said transistor, and a capacitor connected between said base and collector electrodes.

4. A transmission regulator which includes an amplifier, a pair of oppositely poled diodes connected in series across the input side of said amplifier to control the transmission of energy into said amplifier, a full-wave rectifier circuit, means to supply at least a portion of the output energy of said amplifier to said rectifier circuit, and means to increase both the linearity and the time constant of the regulator action which comprises a transistor having an emitter electrode, a collector electrode, and a base electrode, a first D.-C. circuit path including said rectifier circuit intercoupling said base and emitter electrodes, said rectifier circuit being poled to provide a forward emitter bias for said transistor, a second D.-C. circuit path including both of said diodes intercoupling said emitter and collector electrodes, said diodes being connected substantially in parallel with each other in a portion of said second circuit path common to said first circuit path and said diodes being poled in the direction of positive emitter current flow in said transistor, and a capacitor connected between said base and collector electrodes.

5. A transmission regulator in accordance with claim 4 in which a portion of the output signal energy of said amplifier is supplied to said rectifier circuit.

6. A transmission regulator in accordance with claim 4 which includes band-pass filter means to supply only output energy of a predetermined pilot frequency from said amplifier to said rectifier circuit.

7. In combination, a source of A.-C. signals, a rectifier, and a load connected in tandem transmission relation and an arrangement for increasing the effective time constant of the load input circuit without the use of a large shunt condenser which comprises, in the path between said rectifier and said load, a transistor having its base electrode directly coupled to said rectifier and its emitter electrode directly coupled to said load, a capacitor connected between the collector and base electrodes of said transistor, and a resistance connected between the collector electrode of said transistor and a point of reference potential, said rectifier being poled to provide a forward emitter bias for said transistor.

References Cited in the file of this patent

UNITED STATES PATENTS

| | | |
|---|---|---|
| 2,193,966 | Jones | Mar. 19, 1940 |
| 2,252,002 | Halsey | Aug. 12, 1941 |
| 2,387,652 | Dickieson | Oct. 23, 1945 |
| 2,596,510 | Roberts | May 13, 1952 |